US008726326B1

(12) United States Patent
Harris

(10) Patent No.: US 8,726,326 B1
(45) Date of Patent: May 13, 2014

(54) INTERNET BROWSING SYSTEM USING A WIRELESSLY RECEIVED HYPERLINK

(71) Applicant: Scott C. Harris, Rancho Santa Fe, CA (US)

(72) Inventor: Scott C. Harris, Rancho Santa Fe, CA (US)

(*) Notice: Subject to any disclaimer, the term of this patent is extended or adjusted under 35 U.S.C. 154(b) by 0 days.

(21) Appl. No.: 13/844,995

(22) Filed: Mar. 17, 2013

Related U.S. Application Data

(63) Continuation of application No. 12/793,892, filed on Jun. 4, 2010, which is a continuation of application No. 11/832,360, filed on Aug. 1, 2007, now abandoned, which is a continuation of application No. 09/669,959, filed on Sep. 26, 2000, now Pat. No. 7,340,763.

(60) Provisional application No. 60/161,700, filed on Oct. 26, 1999.

(51) Int. Cl.
H04N 21/858 (2011.01)
H04N 21/81 (2011.01)
H04N 21/4722 (2011.01)

(52) U.S. Cl.
CPC ........ *H04N 21/8586* (2013.01); *H04N 21/8583* (2013.01); *H04N 21/4722* (2013.01); *H04N 21/8133* (2013.01)
USPC ............................... 725/113; 725/40; 725/51

(58) Field of Classification Search
CPC ............ H04N 21/8586; H04N 21/858; H04N 21/8583; H04N 21/4722; H04N 21/4725; H04N 21/8133
See application file for complete search history.

(56) References Cited

U.S. PATENT DOCUMENTS

| 5,761,616 | A | 6/1998 | Lohninger |
| 5,774,660 | A | 6/1998 | Brendel et al. |
| 5,778,181 | A | 7/1998 | Hidary et al. |
| 5,818,935 | A | 10/1998 | Maa |
| 5,903,621 | A | 5/1999 | Rebec et al. |
| 5,903,816 | A | 5/1999 | Broadwin et al. |
| 5,929,850 | A | 7/1999 | Broadwin et al. |
| 5,949,679 | A | 9/1999 | Born et al. |
| 5,961,603 | A | 10/1999 | Kunkel et al. |
| 6,025,837 | A | 2/2000 | Matthews, III et al. |
| 6,061,719 | A | 5/2000 | Bendinelli et al. |
| 6,094,156 | A | 7/2000 | Henty |
| 6,097,441 | A | 8/2000 | Allport |

(Continued)

FOREIGN PATENT DOCUMENTS

WO  98/17064  4/2008

OTHER PUBLICATIONS

Howlett, Andrew et al. GNU Pilot SDK Tutorial. 1997. Retrieved Jul. 25, 2012. http://www.brouhaha.com/-eric/palm/gnu_pilot_sdk_tutorial/GN U Pi lot_SDK Tutorial. html.

(Continued)

*Primary Examiner* — Bennett Ingvoldstad
(74) *Attorney, Agent, or Firm* — Law Office of Scott C. Harris, Inc.

(57) ABSTRACT

A system for automatically using internet information which is contained within a commercial on an entertainment medium e.g. television. The system determines information indicative of the web address. This can be done automatically by optical character recognition or by storing information indicative of the web address in an interval of the television signal. Once obtained, the information is sent, either to a user's computer, or to a central office which sends an e-mail to the user. In this way, the information can be used to automatically jump to a web site of the advertiser.

20 Claims, 3 Drawing Sheets

(56) References Cited

U.S. PATENT DOCUMENTS

| | | |
|---|---|---|
| 6,127,941 A | 10/2000 | Van Ryzin |
| 6,240,555 B1 | 5/2001 | Shoff et al. |
| 6,243,707 B1 | 6/2001 | Humplemann et al. |
| 6,246,441 B1 | 6/2001 | Terakado et al. |
| 6,326,982 B1 | 12/2001 | Wu et al. |
| 6,400,407 B1 | 6/2002 | Zigmond et al. |
| 6,411,725 B1 | 6/2002 | Rhoads |
| 6,429,846 B2 | 8/2002 | Rosenberg et al. |
| 6,487,538 B1 | 11/2002 | Gupta et al. |
| 6,545,587 B1 | 4/2003 | Hatakeyama et al. |
| 6,604,242 B1 | 8/2003 | Weinstein et al. |
| 6,618,039 B1 | 9/2003 | Grant et al. |
| 6,622,306 B1 | 9/2003 | Kamada |
| 6,647,410 B1 | 11/2003 | Scimone et al. |
| 6,674,993 B1 | 1/2004 | Tarbouriech |
| 6,769,127 B1 | 7/2004 | Bonomi et al. |
| 7,578,443 B1 | 8/2009 | Harris |
| 2002/0032839 A1 | 3/2002 | Yamamoto et al. |
| 2004/0078824 A1 | 4/2004 | Krisbergh et al. |

OTHER PUBLICATIONS

"Handbook for the Palm III Organizer" 1998. Accessed Jan. 13, 2012. http://ec1.images-amazon.com/media/i3d/0 1/A/man-migrate/MAN UALOOOOO0426.pdf.

"What is cache?" Ask Yahoo! Mar. 29, 1999. http://ask.yahoo.com/19990329.html.

INTERNET BROWSING SYSTEM USING A WIRELESSLY RECEIVED HYPERLINK

CROSS REFERENCE TO RELATED APPLICATIONS

This application is a continuation of U.S. Ser. No. 12/793,892 filed Jun. 4, 2010, which is a continuation application of U.S. Ser. No. 11/832,360 filed Aug. 1, 2007, now abandoned, which is a continuation of U.S. Ser. No. 09/669,959, filed Sep. 26, 2000, now U.S. Pat. No. 7,340,763 issued Mar. 4, 2008, which claims the benefit of the U.S. Provisional Application No. 60/161,700, filed on Oct. 26, 1999, the disclosure of which is herewith incorporated by reference in their entirety.

BACKGROUND

The present application describes a technique for automatically capturing Internet addresses that are broadcast as part of an entertainment media.

Many commercials on entertainment media, such as television and radio, include an Internet address therein. For this part of the advertising to be effective, the user must remember these Internet addresses, since they are broadcast as part of the commercial. Therefore, the Internet addresses broadcast on such media are only really effective when they refer to an easy-to-remember domain name.

The simple domain names, unfortunately, are valuable and limited commodities. Great cost can be associated with obtaining a simple name of this type.

In addition, since the address to be displayed must be simple, it does not readily allow any complicated addresses, e.g., subdomains within the main domain.

Non-commercial parts of the entertainment media can also display Internet addresses. For example, a web site associated with a TV show can be displayed during the credits of the TV show.

SUMMARY

The present application teaches a system of allowing information from an entertainment media to be communicated to a computer or other device, which runs an Internet interfacing program, such as a web browser.

In one aspect, the present system automatically calls up the web address that is transmitted by the entertainment media.

In another aspect, the web address is saved for later use.

The web address can be coded to include information about its source. This enables determination of the effectiveness of the advertisement.

BRIEF DESCRIPTION OF THE DRAWINGS

These and other aspects will be described in detail with reference to the accompanying drawings, wherein.

DETAILED DESCRIPTION

Figure 1:
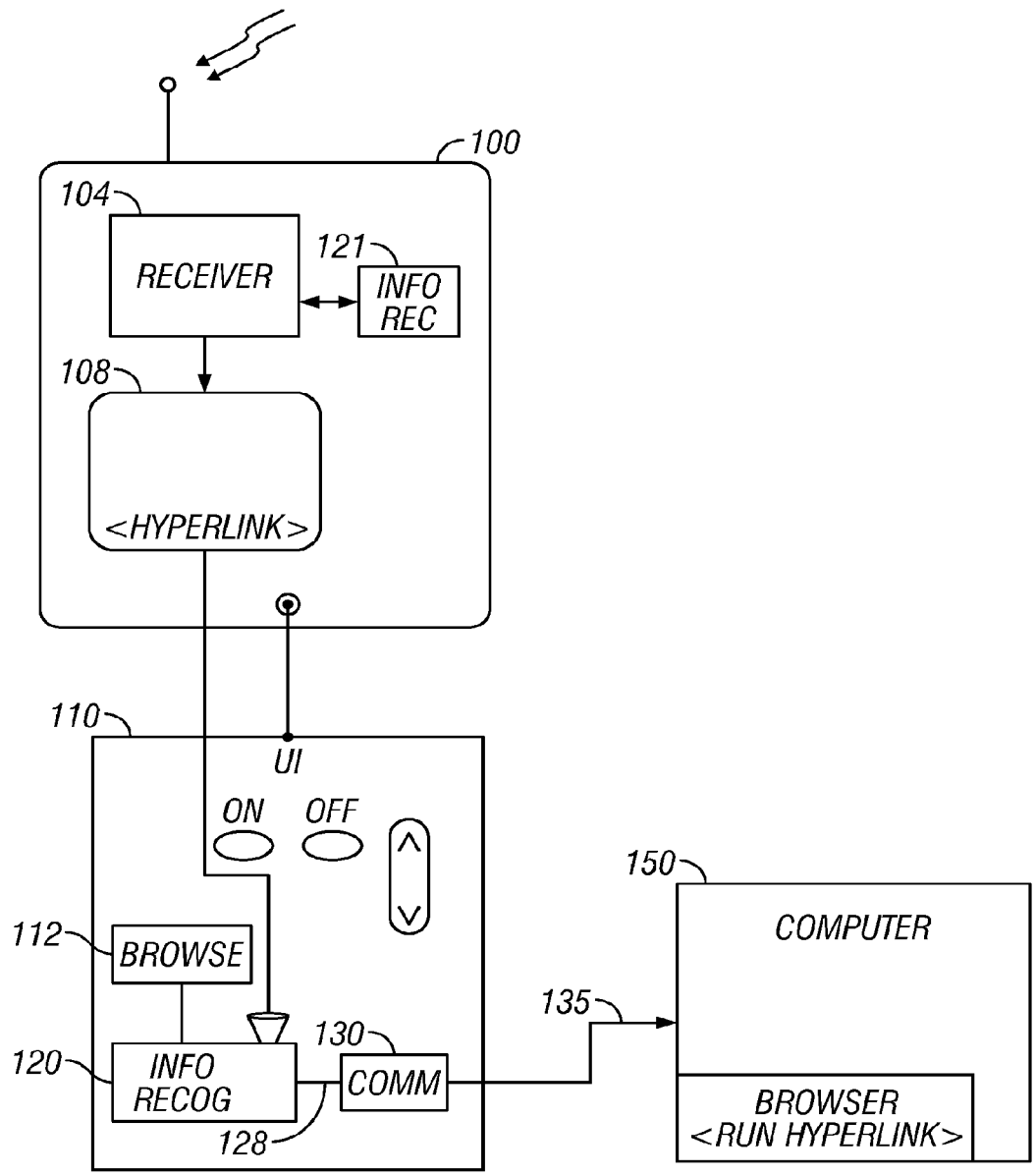
FIG. 1 shows a block diagram of a first embodiment that recognizes the hyperlink.

FIG. 1 shows an embodiment of the present invention, in which the entertainment media is a television system.

A television receiving system 100 is shown receiving a television broadcast 102. The television receiving system includes at least a television receiver element 104, and may also include a television view screen 108. The television broadcast can be via standard transmission, satellite reception, or cable reception or via any other medium for television broadcast.

Some parts of the television broadcast may include Internet addresses. This can be part of the program broadcast or part of a commercial associated with the television broadcast. The Internet address is often transmitted as part of the seen part of the broadcast 102.

The television also includes a user interface, generally shown as 110. The user interface can include one or more of a control panel on the television, a remote control operable by a user, and/or a voice recognition remote control which recognizes voice-activated commands. The user can enter various commands via the user interface 110 include commands to turn-on the television, turn-off the television, change the channels, and the like.

FIG. 1 shows the user interface being a wireless remote control, but the user interface can be part of the television, or part of some other device.

This remote control can also operate the TV. The remote can be infrared, for example. The infrared remote embodiment is a retrofit system for existing television sets. The remote itself is preprogrammed with, or learns codes to, control the television. The remote control can include computing intelligence therein. For example, the remote control can be a personal digital assistant, e.g., a Palm™ computer, programmed to operate as a remote.

The user interface 110 also includes a "browse" function 112. The browse function is actuated when the user wants to use the Internet address that is associated with currently-displayed information on the television screen 108. In a particularly preferred embodiment, actuation of the "browse" button 112 takes some action on an Internet address that is displayed on the television display screen.

An information recognition module 120 is associated with the television set. This module 120 may be within the television set, or, as shown, within the remote control. In a first embodiment shown in FIG. 1, the recognition module can be a miniature camera, located within the remote control system. The recognition module 120 obtains an image of the picture on the television screen 108 by integrating the picture for the time of one or more fields and one or more frames. A processor within the information recognition unit treats the acquired picture as an image, and optically character recognizes ("OCR") the characters within the image.

Optical character recognition programs are known, including programs such as Adobe Circulate™ and Caere Omni Page™.

An image is obtained responsive to the browse command, the image is optically-character-recognized, and the automatically-recognized image is processed to automatically determine a Internet address therein. Automatic detection of hyperlinks can be done by searching for key terms such as "http" or "www" or ".com", ".net" or others (.shop, .web, .firm, .arts, .rec, .info).

This can also be done by correlating each letter of the alphabet across the entire image. For example, the letter "a" can be correlated against the entire image to find all "a"s or close matches to "a"s in the image. By following this procedure throughout the entire image, the closest match to letters can be found within the TV image.

The obtained hyperlink information is used to take some action related to the hyperlink. FIG. 1 shows the remote 110 being equipped with a short-range communication device 130. This capability can be on a so-called "part 15" frequency, e.g. 48 Mhz; 900 Mhz; or 2.4 Ghz. A particularly interesting communication technique is via Bluetooth™ communication. The communication could also be via wireless Ethernet or wired Ethernet. A message 128 is formed based on the automatically-recognized hyperlink within the television image. That message is sent to the communication device 130, and wirelessly transmitted as 135. Information is transmitted in this format to a personal computer 150. The PC receives the automatically-recognized hyperlink.

If the PC or laptop is running and connected to the internet, the address represented by the hyperlink is accessed. The web page is read out and displayed. Alternately, information can be added to the computer, which causes the PC to bring up the web page represented by the hyperlink at the next time the computer is started, or the next time that the browser is started. This can be set as a temporary start page that will be shown only the next time the browser is started.

Alternatively, the information can be added to the user's "Favorites" list, e.g. in a subdirectory called "Look at for further information".

A second embodiment carries out the recognition within the television unit itself. The "browse" command can still be controlled based on a command from a separate remote. A buffer in the TV is used to store an entire frame of RGB information. That information is converted to a gray-scale image. The information in the image is optically-character-recognized. The hyperlink detection is carried out in the same way as in the first embodiment described above. The information recognition unit 121 in the television unit is used.

This embodiment may require modifying the television to include the information recognition unit.

Another embodiment marks the hyperlink in alternative ways. For example, when the hyperlink is displayed on the screen, it can also be marked as a hyperlink in another portion of the television signal, such as in the vertical blanking interval. Line 16 or 21 of the vertical blanking interval can, for example, include digital information indicative of one or more hyperlinks.

Another option reads the hyperlink from within the closed captioning information of the TV signal. This text can be directly used as an Internet address.

In this embodiment, the information recognition unit 120 or 121 is a closed captioning decoder.

Figure 2:
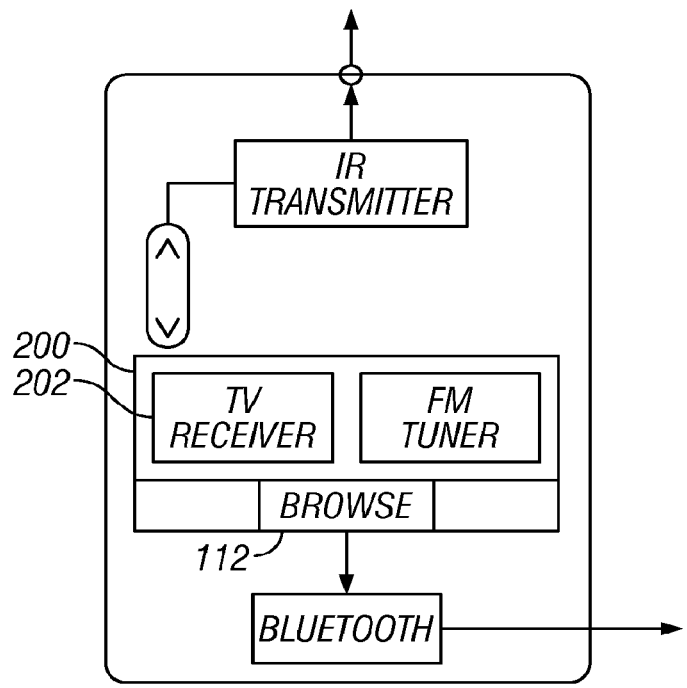
FIG. 2 shows a modification in which the remote includes a receiver element.

Another option shown in FIG. 2 uses a separate receiver 200 within the remote 110. The receiver could be a TV tuner 202 and/or FM tuner 204. The hyperlinks associated with the entertainment program are transmitted on the TV band, e.g. in the closed captioning portion, or in the FM band. The signals are received by the receiver 200. The receiver 200 is constantly receiving the Internet addresses, if any, associated with current media programs. Pressing the "browse" button 112 causes the currently-received hyperlink to be transmitted by a short range communication protocol, such as by Bluetooth™, to the PC.

The TV remote can have a receiver for closed caption information, or for other information within the VBI. This allows the TV remote to be used with the existing television systems and sets, with no modification whatsoever. All new circuitry (if any) is placed within the remote. If a programmed computer or PDA is used as the remote, then all the changes necessary may include reprogramming the user interface.

In another embodiment, the television or set top box associated with the television (e.g., VCR, cable box, or satellite box), can also receive a hyperlink from within the received signal, e.g. coded within the signal. That hyperlink is selected by the browser actuations.

An alternate way of taking the action based on the hyperlink operates by sending information to a service provider, rather than to the PC.

Figure 3:
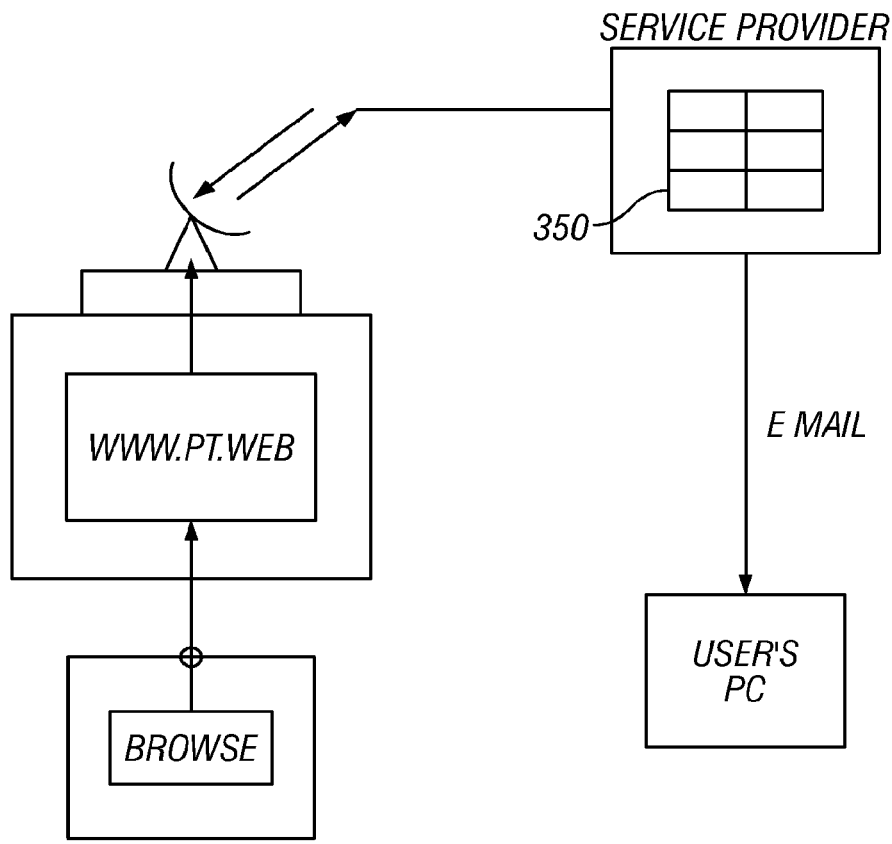
FIG. 3 shows a paradigm in which the service provider participates in sending the desired hyperlink to the user.

FIG. 3 shows this being done over the broadcast channel for two-way media is being used, e.g., in digital cable or satellite. The browse button sends either the hyperlink information to the service provider, or just the timing and channel of the browse actuation to the television provider. In the latter case, the television provider stores a database 350 defining which hyperlink was displayed at any given time.

In this embodiment, the television and/or remote need not even recognize the hyperlink. Rather, an indication is provided to the cable or satellite company to send more information to the user about that hyperlink.

Since the cable or satellite company must have an account with the user, it knows the user's email address. Upon receiving an indication that the user wants more information about the hyperlink that is displayed on the television at that specific time, the cable/satellite company sends an email either to the sponsor or the user directly. The sent e-mail can indicate the web page address.

This embodiment is also suitable for use with radio, since it does not require reading off of the screen.

A new business method becomes possible in this embodiment. The cable/satellite company can charge a fee for this service, e.g. charging a few cents for each user who receives such an e-mail.

Another embodiment uses the power of this system to display a hyperlink that includes an indication of its origin. The web page address is tagged with an indication of the service provider or the specific commercial. For example, a web page address www.pt.web/info=cbs;sd;101999;838 could call up the site pt.web, and provide the site with the identifying information—cbs (network), sd (geographical area), date of commercial airing (101999) and time of commercial airing (838). That tagged web page address hence uniquely indicates the source of the initiation via a specified commercial or program.

The advertisers can use this to determine which times are most successful for web page actuations. The service provider can negotiate a fee for each tagged visit to the web site. A new method of doing business enables using these complicated internet addresses, since the web site is automatically called up from the address. In this new method of doing business, the service provider can guarantee a specified number of "hits" from the commercial. If less hits are obtained, the advertiser may get a discount. The advertiser may also agree to pay additional amounts for "hits" beyond that guaranteed number.

The desired internet information can be displayed directly on the television. It is known to include internet information over the same channel that is carrying television information, e.g. internet over cable (by cable modem), internet by satellite and the like. Alternately, a telephone line or dsl connection can be connected to the TV, and a web TV system or other equivalent system can be used to browse the internet using the screen of the television set. According to this system, actuation of the "browse" button cause either the screen to switch to an internet browsing window, or to a picture-in-picture type system, with the television program remaining in one picture, and the web browser opening in a sub picture.

The alternative is of course possible, where the web browser opens in the main picture, or two side-by-side pictures may be provided.

Another embodiment operates with a computer video card that also includes a TV tuner, such as the ATI All in Wonder™. In this case, TV can be received and viewed on the computer. The same computer can also operate as a conventional computer, e.g., to receive and display Internet information. This embodiment uses the information in the TV (or radio) program to launch and run an Internet page. This information can be displayed on the video, or coded into some other part of the TV signal, or transmitted on some other channel.

Another method of doing business is made possible by this system for sales-type TV, e.g., shopping channels and infomercials. In these media, a salesman extols the virtues of a product, while trying to get the viewers to buy the product. Hyperlinks can be visible or hidden during this sales pitch. The hyperlinks can bring up supplemental internet information, or can be directly linked to a product order site and/or shopping cart. Hence, by actuating the browse key, the user's computer can be actuated to bring up the order form for a product and to begin the ordering process.

As described above, one embodiment uses a PDA as the remote. The PDA has infra red or RF (e.g., Bluetooth), transmission capability. The PDA can also carry out certain functions. For example, since PDAs, such as the Palm™ computer, are capable of hot sync, they can exchange information with another computer, which is presumably a more powerful ("thicker") client. Therefore, the PDA can store the information about the hyperlink, and only later, during the next hot sync, download it to the main computer. The software running the hot sync can act on the hyperlink as described above, e.g., use it next time, add it to favorites, etc.

Also, the shopping information can be supplemented by using the PDA. The hot sync forms an exchange of information, where the thicker client is notified of the PDA's request for information. The thicker client accesses the Internet or some other information source and obtains more information. Then, the PDA is provided with more information about any items where a shopper has expressed interest. That information can be displayed on the PDA, or on the main computer.

A shopping list, or wish list, can also be stored on the PDA, for example.

Another embodiment teaches web browsing using a personal digital assistant such as the Palm. In this embodiment, as noted above, the Palm is configured as a remote control, either to produce infra red signals, or some other kind of signals such as Bluetooth signals which can be received by the entertainment medium. The remote has conventional controls, such as numeral keys 401, up/down keys 402, mute button 403, etc. In addition, the PDA either has its own receiver installed to independently receive hyperlinks either on the same channel as the television signal, or on a different channel. Alternatively, the PDA can receive hyperlink information from a transmitter on the TV, which can transmit by infrared or Bluetooth or the like.

Figure 4A:
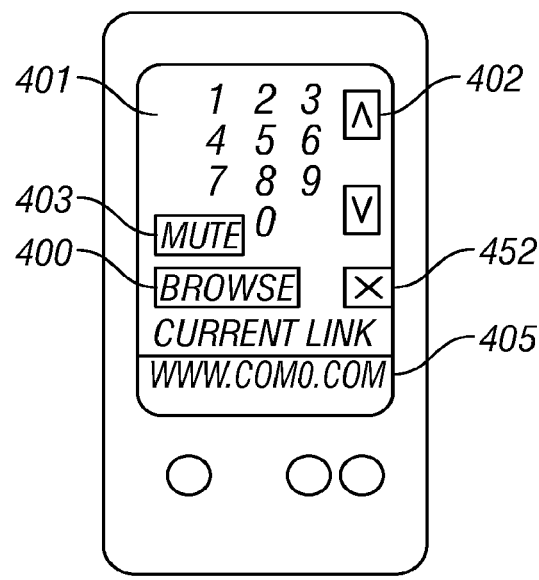
FIGS. 4A and 4B show browsing on a PDA.

One of the available actuations on the PDA-simulated remote is a "browse" actuation 400. When this actuation is actuated, the PDA will begin a browsing actuation to a currently displayed hyperlink 405. In one embodiment as shown in FIG. 4A, the PDA can also have a section within the remote control which can display either the hyperlink, a title of the web page represented by the hyperlink, or the like. The hyperlink can also be any of the previously-described hyperlink systems.

Figure 4B:
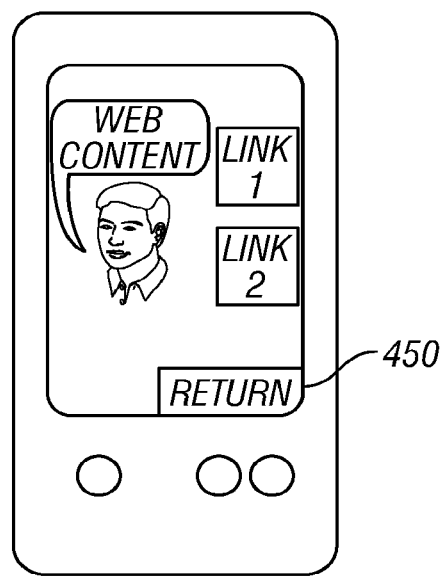

When the browse button 400 is actuated, the PDA is reconfigured from being a remote control into being a web browser, using wireless web browsing techniques, such as used on the Palm VII. The web browser can use any of the conventionally available techniques of PDA web browsing, including a wireless modem, or a short range communication system such as Bluetooth to communicate between the PDA and some server computer such as the user's own PC. One stop wireless web actuation can thereafter be carried out. During the web actuation, a screen as shown in FIG. 4B is displayed. This includes the screen showing the web actuation and may also include a special return button 450 which enables returning to the remote control function. If the user presses the return button 450, he returns to the remote control function The web page remains in memory, and the remote control also shows the "switch" icon 452. In this way, the user can toggle to the remote control function, carry out some operation on the entertainment media, such as muting the TV for example, so that they can better concentrate, and then return to the browsing to read the contents of the web page.

Although only a few embodiments have been disclosed in detail above, other modifications are contemplated and are possible. All such modifications are intended to be encompassed within the following claims. For example, while this application has described television as being the entertainment media, the same operations can be carried out for other media. For example, radio could be continually stored in a buffer of 30 seconds, and then voice recognition techniques could be used to automatically determine hyperlinks within the radio broadcast. Radio could also transmit hyperlinks on a separate carrier, as described above for television.

All such modifications are intended to be encompassed within the following claims.

What is claimed is:

1. A method of interacting with a coded medium, comprising:
    using a computer for reading a coded part wirelessly from a broadcasted medium, where the broadcasted medium is visible to a user of the computer;
    automatically receiving information from the coded part on the computer;
    where the computer is separate from and is not displaying the broadcasted medium;
    where the computer takes an action over the internet based on the information from the coded part, responsive to the user of the computer executing a control on the computer;
    where the information from the coded part is automatically received by the computer and the action over the internet is only taken based on the control being executed by the user, where the information from the coded part includes a hyperlink that addresses the action to be taken over the internet, and where the hyperlink includes an indication of its origin, where the origin includes which of plural different providers carried the coded part.

2. The method as in claim 1, where the coded part is not visible to the user when the user views the medium.

3. The method as in claim 1, wherein said automatically receiving comprises receiving the information wirelessly over an RF link on the computer being operated by the user.

4. The method as in claim 1, wherein the medium is one that is viewable on a screen.

5. The method as in claim 1, wherein the medium views video content.

6. The method as in claim 1, where the information from the coded part includes a way to purchase a product being shown on the medium.

7. The method as in claim 1, where the computer is used to control the medium to show different information by executing controls on the computer to control the medium.

8. The method as in claim 1, further comprising storing said information from the coded part on the computer at a time that the information is received, and using said information from said coded part at a later time.

9. A system comprising:
a computer operated by a user, that receives information indicative of a hyperlink over a radio frequency communication of a broadcasted medium;
where the hyperlink is received without the user executing a control on the computer;
where the hyperlink cannot be seen by the user of the computer;
said computer using said information indicative of the hyperlink to access a web page, and to display the web page on a display of the computer based on a control being executed by the user on the computer, where the hyperlink includes an indication of its origin, where the origin includes which of plural different providers carried the information.

10. The system as in claim 9, where the medium is viewable on a screen.

11. The system as in claim 9, where the hyperlink includes a way to order a product being displayed on the medium being viewed by the user.

12. The system as in claim 9, where the hyperlink is related to an item being displayed on the medium being viewed by the user.

13. The system as in claim 9, wherein information from the hyperlink is stored on the computer.

14. A system, comprising:
a medium that is visible to a user, showing information that is perceived by a user,
said medium having a coded part associated with the medium,
where the coded part is not visible to the user as part of viewing the medium,
and where information from the coded part is sent wirelessly over an RF link to a computer being operated by the user, where the information includes a hyperlink, where the hyperlink includes an indication of its origin, where the origin includes which of plural different providers had the coded part associated therewith.

15. The system as in claim 14, where the medium is one that is viewable on a screen.

16. The system as in claim 14, wherein the medium is showing television content.

17. The system as in claim 14, where the information from the coded part is sent automatically over the RF link.

18. The system as in claim 14, where the medium includes a video being displayed on a screen.

19. The system as in claim 14, where the information includes a way to purchase a product being displayed on the medium.

20. The system as in claim 14, where the computer is a portable computer.

* * * * *